Dec. 28, 1965  R. F. WOODCOCK  3,226,589
FIBER TYPE LIGHT TRANSFERRING DEVICES AND
METHOD OF MAKING THE SAME
Filed March 24, 1960
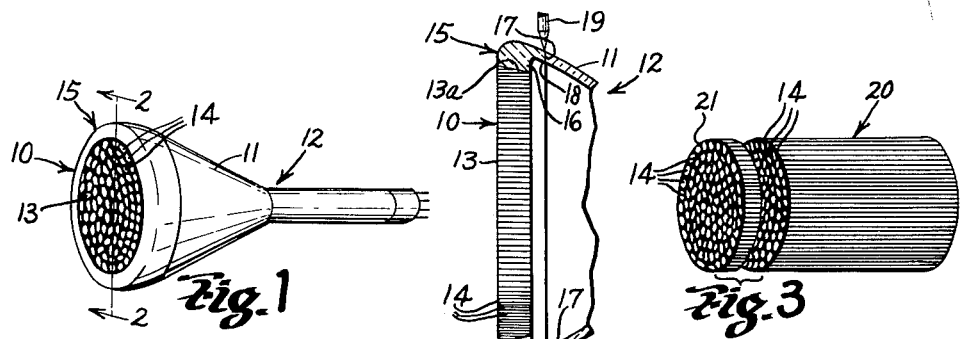
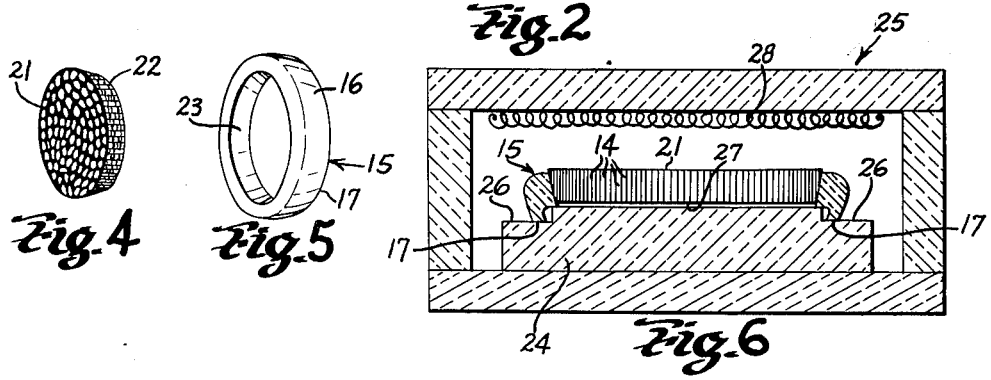
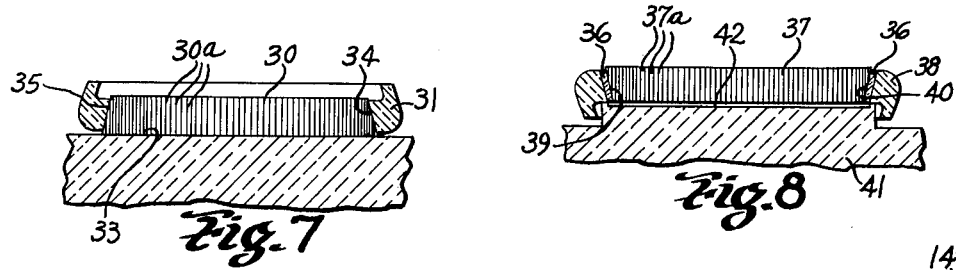
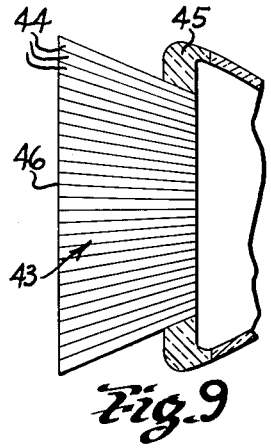
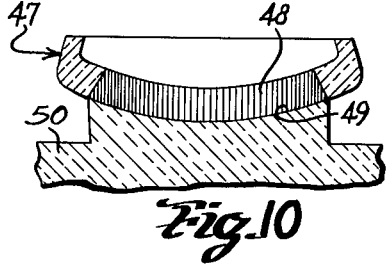
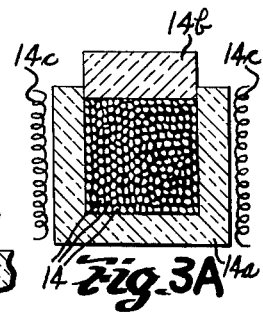
INVENTOR
RICHARD F. WOODCOCK
BY
Louis L. Gagnon
ATTORNEY

# United States Patent Office 3,226,589
Patented Dec. 28, 1965

3,226,589
FIBER TYPE LIGHT TRANSFERRING DEVICES AND METHOD OF MAKING THE SAME
Richard F. Woodcock, South Woodstock, Conn., assignor to American Optical Company, Southbridge, Mass., a voluntary association of Massachusetts
Filed Mar. 24, 1960, Ser. No. 17,390
10 Claims. (Cl. 313—89)

This invention relates to improvements in fiber type energy transferring devices and has particular reference to an improved plate-like conducting device embodying, in part, an intimate assembly of fiber-like conducting elements extending completely through said plate from one side to the other thereof and method of making the same.

Cathode ray tubes and other similar vacuumized or pressurized articles having face plates for transferring light or other forms of energy inwardly or outwardly of the particular article in accordance with its intended function, generally comprise a two-part glass assembly consisting of a glass envelope in which the electrical components of the device are contained and a face plate which is hermetically sealed by fusion to one end of the glass envelope.

Face plates of the type embodying a plurality of individually light-insulated glass fibers in joined side-by-side relation with each other have been proven to have considerable advantage as energy transmitting means in articles such as cathode ray tubes or the like but their use has rendered the tube assembly processes generally more complicated and difficult to perform successfully. That is, it has been relatively difficult to produce a hermetically sealed joinder between a tube envelope and a fiber type face plate without causing distortion or breakage of the fiber structure which, in itself, must be maintained completely impenetrable by air or gases under the pressures resulting from the usual subsequent vacuumizing or possible pressurizing of the interiors of the completed tubes.

The difficulties encountered in heat joining fiber-type face plates with glass envelopes of vacuum tubes or the like relate more particularly to distortion of the individual light-conducting fibers adjacent the peripheral portions of the face plates as a result of the heat applied thereto in bringing about fusion of the parts to be joined. By reason of the fact that glass light-conducting fibers of the light-insulated type each embody a core section of glass having a relatively high index of refraction and an outer surrounding cladding of a glass having relatively low index of refraction for light insulating purposes (the low index glass inherently having a higher melting temperature than that of the high index core glass), it is usually the practice to construct the tube envelope and the fiber assembly of glasses which are preselected to have approximately the same melting temperatures and coefficients of expansion so as to permit the joining of the same by fusion without excessive distortion or breakage of one or the other of the said parts. This practice, however, does not avoid an overheating of the fiber core glasses which have a lower melting temperature than the glasses of the claddings. Thus, when assembling a face plate to a tube envelope by conventional methods, the fiber core glasses which are adjacent the peripheral edge of the face plate become excessively fluid and have a tendency to flow outwardly of their respective surrounding claddings. This condition results in distortion of the affected fibers and causes deterioration of the optical properties thereof.

By the provision of a new and improved fiber type face plate and method of making the same, the present invention overcomes the above-mentioned difficulties relating to the fabrication of electron tubes or similar articles embodying glass envelopes to which glass fiber type face plates are attached by fusion.

It is, therefore, a principal object of this invention to provide an improved fiber type face plate and novel method of making the same.

Another object is to provide a face plate of the fiber type embodying a bundle of glass fiber-like elements joined together in hermetically sealed side-by-side fused relation with each other and rigidly supported, as a unit, in a glass annulus by a hermetically sealed fused peripheral connection with said annulus.

Another object is to provide an improved method of forming a glass face plate assembly of the above character.

Another object is to provide an improved method by which a preformed bundle of glass fibers may be fused directly to a solid glass annular supporting part therefor without appreciably distorting, fracturing or in any way altering the optical and/or physical properties of the fibers.

Another object is to provide an improved glass fiber type face plate construction of the above-mentioned character by means of which a heat sealed connection between the face plate and a glass receiving article can be made without significantly heating the fiber structure of said plate.

Other objects and advantages of the invention will become apparent from the following description when taken in conjunction with the accompanying drawings in which:

FIG. 1 is a diagrammatic perspective view of a preferred form of the invention shown in a position of use on a cathode ray type of electron tube;

FIG. 2 is an enlarged fragmentary cross-sectional view taken approximately along line 2—2 of FIG. 1 looking in the direction indicated by the arrows;

FIG. 3 is a diagrammatic perspective view of a fiber bundle having a section removed therefrom to illustrate an initial step in the method of the invention;

FIG. 3A is a diagrammatic illustration of a method and apparatus for fabricating said fiber bundle;

FIG. 4 is a perspective view of the above-mentioned section of the fiber bundle illustrating the results of the performance of a subsequent step in the method of the invention;

FIG. 5 is a perspective view of an annulus or receiving member into which the fiber bundle section of FIG. 4 is subsequently fitted and secured in accordance with the invention;

FIG. 6 diagrammatically illustrates a preferred method of making an assembly of the parts of FIGS. 4 and 5;

FIGS. 7 and 8 are diagrammatic illustrations of alternate assembly techniques which might be used in forming devices of the type embodying the invention;

FIG. 9 is a vertical cross-sectional view of a modification of the invention; and FIG. 10 illustrates a still further modification of the invention.

Referring more particularly to the drawings wherein like characters of reference designate like parts throughout the several views, a preferred form of the invention embodies a glass face plate 10 (see FIGS. 1 and 2) which is attachable by fusion to the glass envelope 11 of a cathode ray type of electron tube or the like 12. The face plate 10 comprises a central part 13 of preselected front to back thickness which is formed of a multiplicity of individually light-insulated glass light-conducting fibers 14 which are bundled together in fused hermetically sealed side-by-side relation with each other to form an integral rigid structure which is vacuum tight or impenetrable by air or gases under pressure and of such a front to back thickness as to withstand pressures thereon resulting from the vacuumizing or pressurizing of the space within the tube envelopes 11.

The fibers 14 may be formed to any desired cross-sectional size preferably no smaller than 0.0001 of an inch in diameter and each embody a core section of glass having a relatively high index of refraction with a thin outer cladding or jacket of glass having a relatively low index of refraction. The glasses of said core and cladding parts of the fibers are preselected as to their indices of refraction so as to provide the fibers with a desired light acceptance or aperture angle within which light rays entering a particular fiber will be conducted through the fiber by the well-known principle of internal reflection. A measure of the maximum aperture angle of a glass clad glass fiber may be made from the formula $u=\sqrt{n_1{}^2-n_2{}^2}$ wherein $u$ represents the aperture half angle, $n_1$ represents the indext of refraction of the core glass and $n_2$ represents the index of refraction of the cladding glass. As an example, a desirable fiber construction having a light-aperture angle of approximately 60° might embody a core section formed of an optical flint glass having an index of refraction of approximately 1.75 and a cladding formed of a crown or soda lime glass or the like having an index of refraction of approximately 1.52.

In addition to having the central fiber part 13, the face plate 10 is provided with an outer annulus 15 of glass into which the fiber part 13 is fitted and joined by fusion about its peripheral edge 13a in a manner to be described in detail hereinafter. The annulus 15 is provided with a rim-like flanged portion 16 preferably having an edge thickness approximately equal to the thickness of the glass envelope 11 of a tube 12 to which the face plate 10 is to be applied. The rim-like flange 16 is also preferably of substantially the same contour shape and size as the respective adjacent end of the tube envelope 11 as shown in FIGS. 1 and 2 so as to provide matching adjoining faces 17 and 18 on the respective parts 15 and 11 when the face plate is applied to the tube envelope 11 as shown in FIGS. 1 and 2.

Assembly of the face plate 10 to the tube envelope 11 is accomplished by heat sealing or fusing together the said faces 17 and 18 of the respective adjoining parts preferably by applying flame heat thereto with a suitable gas torch or the like 19. The glasses of the annulus 15 and tube envelope 11 are preselected to be of such character as to have approximately the same melting points and coefficients of expansion for purposes of producing a substantially strain-free and distortionless joinder therebetween. Furthermore, since the fused connection between the peripheral edge 13a of the fiber part 13 and the annulus 15 is made by heat joining the fiber assembly to the glass of the annulus 15, it is desirable to form the fiber assembly and the annulus 15 of glasses which have compatible coefficients of expansion. For example, a preferred face plate construction might embody a fiber part 13 constructed of fibers 14 having core parts of an optical flint glass, claddings of soda lime or potash soda lead glass and an annulus 15 and tube envelope 11 preferably formed of potash soda lead glass.

Referring more particularly to the fabrication of the face plate 10, the fiber part 13 thereof is formed from an elongated fused fiber bundle 20 having approximately the same or a slightly larger cross-sectional size and shape than that desired of the finished fiber part 13. The fiber bundle 20 is fabricated by placing a preselected number of fibers in grouped side-by-side parallel relation with each other and heating the same to a temperature sufficient to bring about fusion of the adjoining side surfaces of the fibers. In forming vacuum tight fiber bundles of the type required in this instance, pressure is usually applied laterally to the fiber bundle during the fusing operation to literally squeeze the fibers together and thus eliminate voids or spaces between the individual fibers of the finally formed fused bundle 20. It has also been a practice to draw a vacuum in the spacings between the fibers of the bundle during the fusing thereof to further eliminate entrapment of air or gases and thus avoid the occurrence of air or gas bubbles in the finished structure so as to render the bundle impervious to air or gases throughout its length. The fiber bundle 20 may be fabricated by any one of various well-known techniques such as, for example, that shown in FIG. 3A wherein a plurality of fibers 14 are placed in side-by-side relation with each other in a trough-like mold 14a formed of refractory material. The fibers 14 are then heated to a suitable softening and fusing temperature of approximately 1175° F. for glasses of the above-mentioned type by means of suitable electrical heating units 14c which may be connected in conventional manner to a suitable source of electrical energy. A lateral compressing force is applied to the bundle of fibers 14 during fusion thereof by causing a refractory block or the like 14b to be forced against the fiber bundle to produce a tight hermetically sealed connection between each of the fibers 14 throughout the length of the bundle thereof. The bundle of fibers is then slowly cooled and shaped by grinding to the configuration shown in FIG. 3.

It is pointed out that, alternatively, the fused fiber bundle structure 20 may be formed my methods such as shown and described in assignee's co-pending application Ser. No. 717,035, filed Feb. 24, 1958, in the name of John W. Hicks, Jr., or Ser. No. 2,770, filed Jan. 15, 1960, in the name of John W. Hicks, Jr., et al.

Once having formed the bundle 20 of the fibers 14, a section 21 which is to ultimately become the part 13 of the face plate 10 is cut from the bundle 20 as shown in FIG. 3. The fiber section 21 is controlled to be of a substantially uniform front to back thickness slightly greater than that desired of said part 13 to allow for a subsequent removal of stock from its opposite sides when optically finishing the same in a manner to be described in detail hereinafter.

The peripheral edge portion 22 of the section 21 is next provided with a conical taper (see FIG. 4) which is inclined inwardly approximately 3 to 5 degrees. The taper is formed on the edge portion 22 by grinding the same preferably to a finish equivalent to that obtainable with an emery having a grit size averaging approximately 22 microns. During the grinding of the taper, the outer contour dimension of the larger end face of the fiber section 21 is brought down to a desired size and contour shape by control of the depth of the cut produced by said grinding.

Prior to making the assembly of the fiber section 21 with the glass annulus 15, the annulus 15 is provided with a tapered edge 23 about its inner periphery which is so controlled in size and shape as to mate with the edge portion 22 of the fiber section 21. Its peripheral contour dimension, however, is controlled in accordance with that of the fiber section 21 so as to cause an initial slight protrusion of the fiber section 21 outwardly of the annulus 15 when a cold assembly of the two parts is made, that is, before heat is applied to the assembled parts 21 and 15.

In FIG. 6 there is shown a preferred method of forming a secure strain-free fused connection between the assembled fiber section 21 and the glass annulus 15 without causing appreciable distortion of the fibers 14. In making the fused connection between the fiber section 21 and the annulus 15 the annulus 15, having the fiber section 21 therein, is placed upon a refractory block 24 within a furnace or suitable heating chamber 25. The faces 17 of the flanged part 16 of the annulus 15 are seated upon a recessed annular shoulder 26 formed on the upper side of the block 24 and the shoulder 26 is of such a depth as to cause the flat upper surface portion 27 of the block to be only slightly spaced, for example .002 or .003 of an inch from the inner adjacent side of the annulus 15 as shown in FIG. 6. Heat is then applied to the assembly by conventional heating elements or the like 28 to render the adjoining glasses of the section 21 and the annulus 15 fusable. At this time, the fiber section under the forces of gravity will lower into the annulus to the point where it engages the surface 27 of the refractory block. In so doing, a snug vacuum or airtight seal is produced between the adjoining tapered edges of the fiber section 21 and the glass annulus 15.

Because of the fact that the fiber section 21 is in such a close proximity to the surface portion 27 of the block 24 at all times during fusion of the glass assembly (see FIG. 6), any tendency for the fiber 14 core glasses to flow downwardly and outwardly of their respective claddings will be prevented by a damming effect produced by the surface 27 of the block 24. Thus, although the core glasses of the fibers 14 have a lower melting temperature than that required to fuse the claddings thereof to the glass annulus 15, as mentioned hereinabove, it can be seen that a substantially distortionless assembly of the parts 21 and 15 can be accomplished in the manner just described.

With the fiber section 21 and the annulus 15 formed of the glasses given hereinabove as examples, temperatures of approximately 1140° F. used for a time cycle of from one-half to one and one-half hours will produce the desired results of proper fusion of the parts.

After fusion and slow cooling of the glass assembly, the fiber section 21 thereof is optically ground and polished on one or both of its opposite sides by conventional glass working techniques to render the end faces of the fibers 14 readily receptive to light entering or exiting from the same. The extent or depth of grinding and polishing is also controlled to finish the resultant fiber part 13 of the finished face plate 10 to a desired thickness.

Having finished the face plate 10 it may then be attached by fusion to a receiving article such as the tube envelope 11 in the manner described hereinabove without significantly heating the fibers 14 of the face plate since the volume of glass between the fibers 14 and the face 17 of the annulus 15 which adjoins the tube envelope 11 is such as to absorb the major portion of the heat resulting from fusion of the faces 17 and 18 shown in FIG. 2 thereby preventing overheating of their core glasses.

An alternate method of making a fused glass assembly of the above character embodying a prefused fiber bundle 30 and a glass annulus 31 is shown in FIG. 7 wherein the parts 30 and 31 which are substantially identical to the above-described parts 21 and 15 are inverted. The fiber bundle 30 is placed upon a refractory block 32 with its side of greatest area resting against the flat surface 33 of the block 32. The annulus 31, having an inner tapered opening 34, is then fitted over the mating tapered peripheral edge 35 of the fiber bundle 30. After having made the assembly shown in FIG. 7, a precontrolled heat sufficient to cause fusion of the adjoining glasses of the parts 30 and 31 is applied to the glass structure and the resultant softening of said adjoining glasses will produce a snug vacuum-tight fit therebetween as a result of the lowering of the annulus 31 onto the fiber bundle 30 under the force of gravity tending to pull the same downwardly.

Again, it can be seen that because of the fact that the end faces of the fibers 30a are in engagement with the surface 33 of the block, any tendency for distortion of the fiber bundle 30 or for the lower meling point core glasses of the fibers 30a to flow outwardly of their respective claddings during fusion of the parts 30 and 31 is prevented by the abutting relationship of the fiber bundle 30 and surface 33 of the block 32. Thus, possible distortion of the optical and/or physical properties of the fibers 30a is avoided.

It is also pointed out that by the use of the tapered connection between the parts of the face plate assemblies shown in both FIGS. 7 and 8 the annulus and fiber parts of the face plate assembly are maintained in direct interfitting edge-to-edge contact with each other at all times during the fusing together of said parts.

A further modification of the invention is shown in FIG. 8 wherein a sealing or flux glass 36 or the like may be used to form the fused connection between a prefused fiber bundle section 37 and an annulus 38. A preferred sealing glass would be a controllably devitrifiable glass which melts at a temperature of approximately 900° F. such as the commercially available product known as Pyroceram cement which is manufactured and distributed by the Corning Glass Works, Corning, N.Y.

In making the assembling of the parts 37 and 38, a preferred method would be to select a sealing or flux glass which is initially in powdered form and to mix the same to a paste-like consistency with a suitable vehicle such as a nitro-cellulose binder. The paste-like mixture is then painted or otherwise applied to the peripheral edge of the tapered opening 39 in the annulus 38 and/or to the edge portion 40 of the fiber section 37 whereupon the respective parts are assembled, as shown in FIG. 8. A controled heat sufficient to melt and devitrify the flux glass and form a desired fused connection between said parts 37 and 38 is then applied to the assembly.

It will be noted that the refractory supporting block 41 of FIG. 8 is relieved slightly at 42 to permit the fiber bundle 37 to drop or become lowered a controlled amount into the annulus 38 under the force of gravity when the flux glass 36 is softened suitably for fusion with the respective parts 37 and 38. This provides a tight hermetically sealed joinder between the parts 37 and 38. The relieved part 42 of the block 41 is, however, of such a minimum depth as to prevent any appreciable sagging of the fiber part 37 should the glasses of the fibers be rendered flowable by the heat applied thereto during the fusing of the parts 37 and 38.

In FIG. 9 there is shown an alternate form of the invention wherein a prefused bundle 43 of the tapered fibers 44 is fused into a glass annulus 45. The assembly of the fiber bundle 43 and annulus would be accomplished preferably in a manner similar to that described above with relation to the parts 30 and 31 of FIG. 7. That is, the larger forward face 46 of the fiber bundle 43 would be rested against the surface 33 of the refractory block 32 with the annulus 45 slipped over the tapered sides of the bundle 43, so as to be free to lower onto the fiber bundle 43 under the forces of gravity when a suitable fusing temperature is applied to the same. It is pointed out that the front to back thickness of the fiber bundle 43 may be controlled to be of any desired dimension in accordance with the extent of taper of the fibers 44 so as to provide a desired magnification or demagnification of light images or the like which may ultimately be transferred through the fiber bundle 43.

It should be understood that while the face plates shown and described with relation to FIGS. 1–9 all have prefused fiber bundles embodying flat opposite side faces, the said opposite faces may be optically ground and polished to any desired spherical or other shape after the fused assembly of the face plates is made. Alternatively, if it is desired to preshape the opposite sides of the fiber sections of the face plates to a particular curvature before making the above-described assembly, the fiber supporting surfaces 27, 33 and 42 of the respective refractory blocks 24, 32 and 41 would be correspondingly shaped to the particular curvature of the preshaped fiber section of the face plate. In FIG. 10 there is shown for purposes of illustration such a face plate 47 having a preshaped fiber section 48 resting against a curved surface 49 formed on a refractory block 50.

From the above, it can be seen that by the provision of the glass annuluses on the different face plates of the invention, any one of said face plates may be edge fused to a receiving article without significantly heating or in any way distorting or disrupting the fiber sections thereof since the volume of glass which makes up the various annuluses will absorb a substantial portion of the heat required for said fusion before said heat reaches the fiber section of the face plates. It is also pointed out that in the fabrication of the face plates themselves the fiber sections and receiving openings which are provided therefor in the annuluses may be preformed to other peripheral shapes and sizes than those which have been shown by way of example and prior to fusing, the engaging tapered surfaces may be initially polished so as to have relative intimate engagement with each other. It has been found that such intimate engagement permits fusion of said surface at lower temperature than otherwise possible.

It will be seen from the foregoing that simple, efficient and economical means and method have been provided for accomplishing all of the objects and advantages of the invention as expressed in the accompanying claims and the invention is not to be limited to the exact matters shown and described as only the preferred matters have been given by way of illustration.

Having described my invention, I claim:

1. A face plate of the character described comprising a first member formed of a plurality of glass optical fibers secured together in hermetically sealed fused side-by-side relation so that corresponding opposite ends of said fibers cooperate to define respective light-receiving and light-emitting opposite faces, the edge of said first member being tapered convergently toward one of said faces and having a continuous substantially even surface, a second glass member of rim-like configuration having a continuous substantially even surfaced inner tapered edge of approximately the same perimetric contour shape and degree of taper as said edge of said first member, said first and second members being mated with respective tapered edges thereof in side-by-side relation and interjoined by a fused hermetically sealed connection.

2. A face plate of the character described comprising a first member formed of a plurality of glass optical fibers secured together in hermetically sealed fused side-by-side relation so that corresponding opposite ends of said fibers cooperate to define respective light-receiving and light-emitting opposite faces, the edge of said first member being tapered convergently toward one of said faces and having a continuous substantially even surface, a second glass member of rim-like configuration having a continuous substantially even surfaced inner tapered edge of substantially the same perimetric contour shape and size as said edge of said first member, said members being mated with respective tapered edges thereof in adjoining hermetically fused relation with each other.

3. A face plate of the character described comprising a first member formed of a plurality of glass optical fibers secured together in hermetically sealed fused side-by-side relation so that corresponding opposite ends of said fibers cooperate to define respective light-receiving and light-emitting opposite faces, the edge of said first member being tapered convergently toward one of said faces and having a continuous substantially even surface, a second glass member of rim-like configuration having a continuous substantially even surfaced inner tapered edge of approximately the same contour shape and degree of convergence as said edge of said first member and of a somewhat larger perimetric dimension, said first member being positioned approximately centrally within said second member with respective edges of said members disposed in substantially parallel side-by-side relation, glass securing means interposed between said edges of said members continuously therearound and said glass securing means being hermetically fused to said first and second members throughout their respectively adjacent tapered edges.

4. In combination, an electron tube glass envelope initially having an open end of a precontrolled peripheral contour shape and size and a face plate embodying a rim part having substantially the same outer peripheral edge shape and size as said open end of said envelope, said outer edge of said rim part being hermetically fused to said open end of said envelope, said rim part having a substantially even surfaced inner edge of precontrolled perimetric size and shape tapered convergently toward the side thereof disposed inwardly of said envelope, an energy-conducting fiber section embodying a plurality of glass optical fibers secured together in hermetically fused side-by-side relation so that corresponding opposite ends of said fibers cooperate to define respective light-receiving and light-emitting faces, said fiber section having a continuous substantially even surfaced outer tapered edge of approximately the same perimetric contour shape and degree of taper as said inner edge of said rim part disposed in side-by-side relation with said inner edge of said rim part and joined thereto by a hermetically sealed fused connection.

5. In combination, an electron tube glass envelope initially having an open end of a precontrolled peripheral contour shape and size and a face plate embodying a rim part having substantially the same outer peripheral edge shape and size as said open end of said envelope, said outer edge of said rim part being hermetically fused to said open end of said envelope, said rim part having a substantially even surfaced inner edge of precontrolled perimetric size and shape tapered convergently toward the side thereof disposed inwardly of said envelope, an energy-conducting fiber section embodying a plurality of glass optical fibers secured together in hermetically fused side-by-side relation so that corresponding opposite ends of said fibers cooperate to define respective light-receiving and light-emitting faces, said fiber section having a continuous substantially even surfaced outer edge of substantially the same perimetric contour shape and size as said inner edge of said rim part and said respective edges of said rim part and fiber section being hermetically fused directly to one another.

6. In combination, an electron tube glass envelope initially having an open end of a precontrolled peripheral contour shape and size and a face plate embodying a rim part having substantially the same outer peripheral edge shape and size as said open end of said envelope, said outer edge of said rim part being hermetically fused to said open end of said envelope, said rim part having a substantially even surfaced inner edge of precontrolled perimetric size and shape tapered convergently toward the side thereof disposed inwardly of said envelope, an energy-conducting fiber section embodying a plurality of glass optical fibers secured together in hermetically fused side-by-side relation so that corresponding opposite ends of said fibers cooperate to define respective light-receiving and light-emitting faces, said fiber section having a continuous substantially even surfaced outer tapered edge of approximately the same contour shape and degree of convergence as said inner edge of said rim part and of a somewhat smaller perimetric dimension, said fiber section being positioned approximately centrally within said rim part with respective edges thereof disposed in substantially parallel side-by-side relation, glass securing means interposed between said edges of said rim part and fiber section continuously therearound and said glass securing means being hermetically fused to said rim part and fiber section throughout their respectively adjacent tapered edges.

7. The method of making a device of the character described comprising providing a plate-like glass fiber part of preselected thickness and contour size and shape embodying a plurality of glass fibers in fused hermetically sealed side-by-side connected relation with each other, abrading the peripheral edge portion of said fiber part to produce a taper thereon and simultaneously forming said fiber part to a desired finished contour size and shape by said abrasion, selecting a glass rim part of a desired contour size and shape greater than that of said fiber part, abrading the inner edge portion of said rim part to a peripherally tapered contour size and shape substantially matching that of the abraded edge portion of said fiber part, assembling said parts with the respective abraded edge portions thereof in interfitting relation with each other and heating said assembled parts to a temperature sufficient to produce a fused hermetically sealed connection therebetween.

8. The method of making a device of the character described comprising placing a preselected number of elongated glass fibers in intimate side-by-side adjoining relation with each other, fusing said fibers together into hermetically sealed integral relation with each other by applying controlled heat and lateral compressing forces thereto, cutting transversely through said bundle to form a fiber part therefrom of a desired thickness, abrading the peripheral edge portion of said fiber part in such manner as to taper the same to a precontrolled angle while simultaneously forming said fiber part to a desired outer contour size and shape during said abrasion thereof, selecting a solid glass rim part having an outer contour size greater than that of said fiber part, abrading the inner edge portion of said rim part to a tapered shape and size approximately contrageneric to that of said abraded edge portion of said fiber part, assembling said parts with the respective tapered abraded edge portions thereof in interfitted relation with each other and heating the said assembled parts to a temperature sufficient to produce a fused hermetically sealed connection therebetween.

9. The method of making a device of the character described comprising providing a plate-like fiber part of predetermined thickness and outer contour size and shape and which is formed of a plurality of glass fibers hermetically sealed together by fusion in side-by-side relation with each other, abrading the edge of said fiber part in such a manner as to produce a taper thereon while simultaneously forming said fiber part to a desired peripheral contour size and shape by said abrasion, selecting a solid glass rim part having a desired outer edge contour size and shape greater than that of said fiber part, abrading the inner edge of said rim part to a tapered shape and size substantially matching that of the abraded edge portion of said fiber part, assembling said parts with the respective abraded edge portions thereof interfitted, fixedly supporting a first of said parts of the resultant assembly in such manner as to cause its axis to be disposed substantially vertical while permitting the second of said parts to move downwardly on said first part freely under the force of gravity and applying controlled heat to said assembly to cause said second part to lower slightly on said fixed first part in response to softening of the respective glasses thereof and produce a fused hermetically sealed connection between the adjoining tapered edge portions of said parts.

10. The method of making a device of the character described comprising placing a preselected number of elongated glass fibers in intimate side-by-side adjoining bundled relation with each other, fusing said fibers together into hermetically sealed integral relation with each other by applying controlled heat and lateral compressing force thereto, cutting transversely through said bundle to form a fiber part therefrom of a desired thickness, abrading the peripheral edge portion of said fiber part in such manner as to produce a conical taper thereon of precontrolled angle while simultaneously forming said fiber part to a desired outer contour size and shape during said abrasion thereof, selecting an annular solid glass part of a desired outer contour size and shape greater than that of said fiber part, abrading the inner edge portion of said annular part to a peripherally tapered contour shape and size approximately matching that of said abraded edge portion of said fiber part, assembling said parts with the respective abraded edge portions thereof in interfitting relation with each other, fixedly supporting one of the parts of the resultant assembly in such manner as to cause its axis to be disposed substantially vertically while permitting free axial movement of the other part thereof under the force of gravity and said assembly heating sufficiently to soften the adjoining portions of the glasses of said parts thereof and to cause said other part to lower slightly on said fixed part in response to the softening of said glasses and become hermetically sealed to said fixed part throughout the adjoinment of said tapered edge portions of said parts.

References Cited by the Examiner
UNITED STATES PATENTS

| | | | |
|---|---|---|---|
| 1,751,584 | 3/1930 | Hansell | 88—1 |
| 2,091,152 | 8/1937 | Malpica | 234—61 |
| 2,495,697 | 1/1950 | Chilowsky | 250—141 |
| 2,825,260 | 3/1958 | O'Brien | 88—1 |
| 2,877,368 | 3/1959 | Sheldon | 313—65 |
| 2,979,632 | 4/1961 | MacNeille | 313—89 |
| 2,985,784 | 5/1961 | MacNeille | 313—92 |
| 2,992,516 | 7/1961 | Norton | 65—3 |

JOHN W. HUCKERT, *Primary Examiner*

RALPH G. NILSON, GEORGE N. WESTBY, DAVID J. GALVIN, *Examiners.*